N. A. SWENSSON.
OPERATING MECHANISM FOR PUMPS.
APPLICATION FILED DEC. 16, 1913.
1,150,553.
Patented Aug. 17, 1915.
2 SHEETS—SHEET 1.
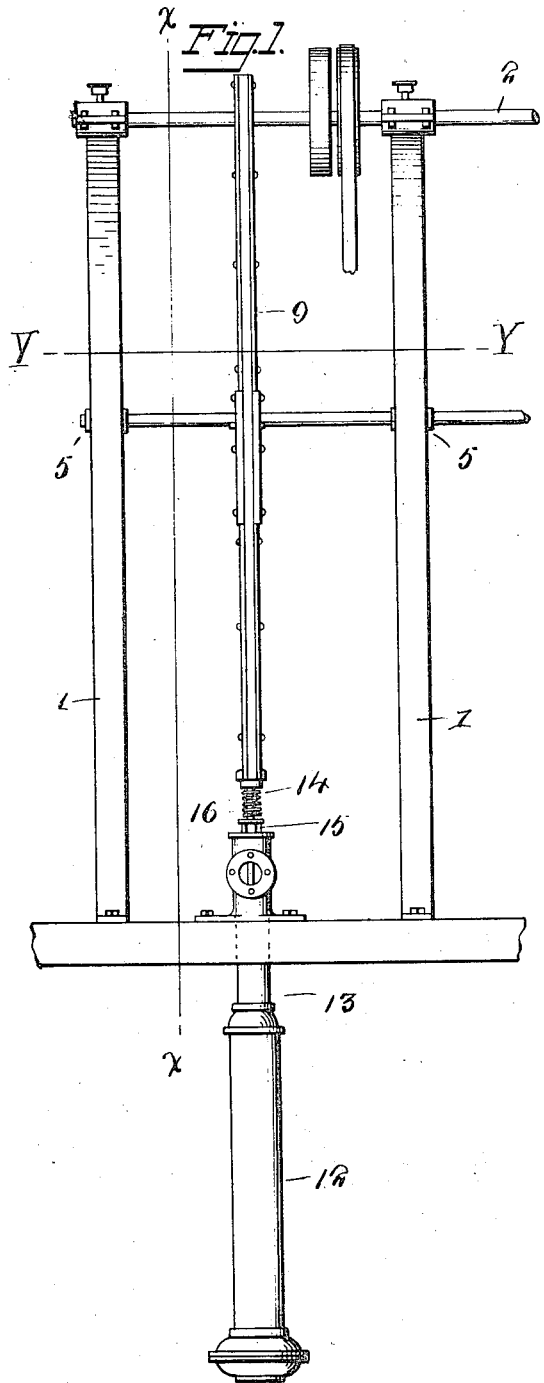
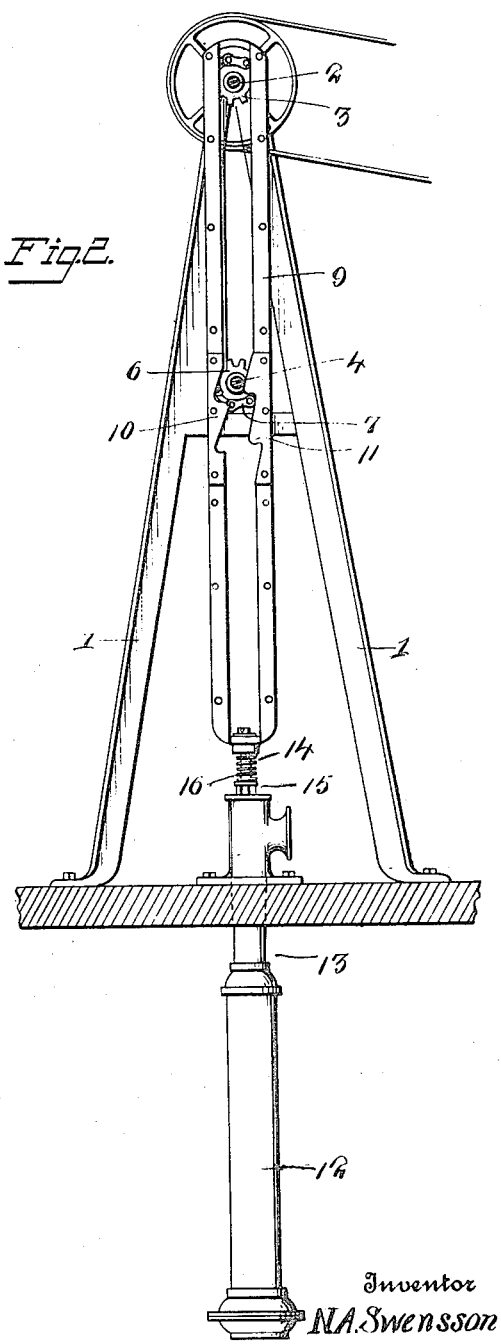
Witnesses
Frederic W. Ely.
V. B. Hillyard.
Inventor
N. A. Swensson
By Victor J. Evans
Attorney N. A. SWENSSON.
OPERATING MECHANISM FOR PUMPS.
APPLICATION FILED DEC. 16, 1913.
1,150,553.
Patented Aug. 17, 1915.
2 SHEETS—SHEET 2.
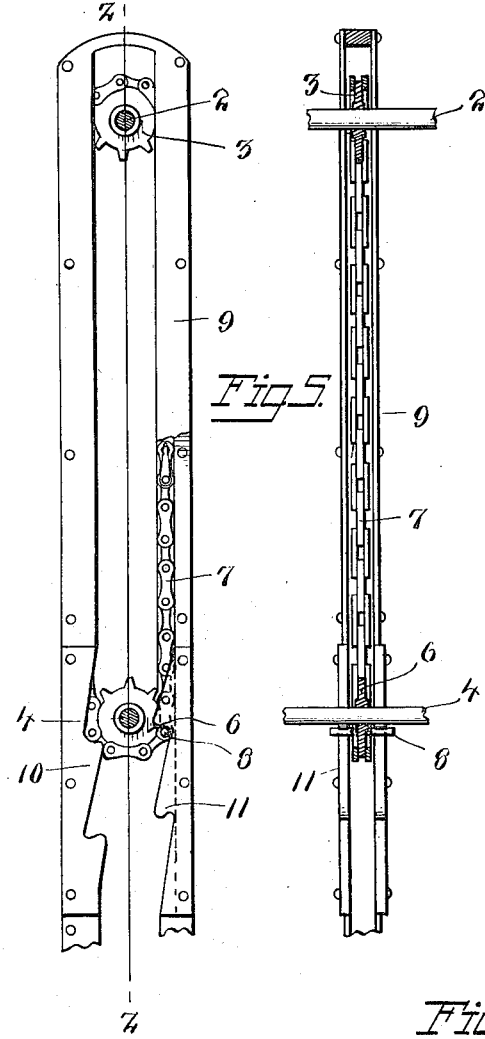
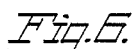
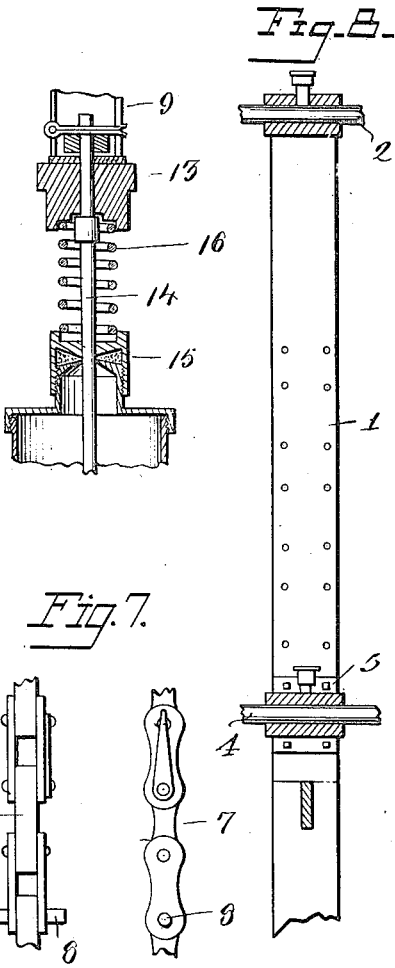
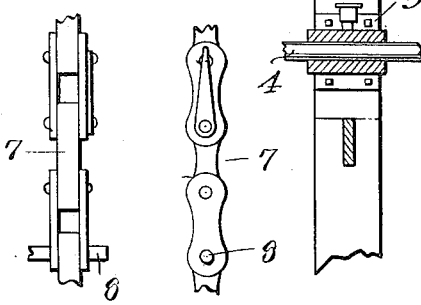
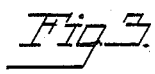
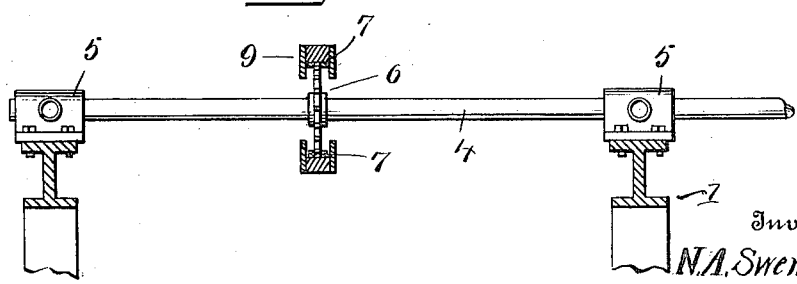
Witnesses
Frederic W. Ely
U. B. Hillyard
Inventor
N. A. Swensson
By Victor J. Evans
Attorney

UNITED STATES PATENT OFFICE.

NELS A. SWENSSON, OF DENVER, COLORADO.

OPERATING MECHANISM FOR PUMPS.

1,150,553.  Specification of Letters Patent.  Patented Aug. 17, 1915.

Application filed December 16, 1913. Serial No. 807,155.

*To all whom it may concern:*

Be it known that I, NELS A. SWENSSON, a citizen of Sweden, but has taken out first papers for citizenship in the United States, residing at Denver, in the county of Denver and State of Colorado, have invented new and useful Improvements in Operating Mechanism for Pumps, of which the following is a specification.

The primary purpose of the invention is the provision of unique actuating means for pumps whereby the stroke may be varied to meet existing conditions with the result that the wear and tear upon the pump cylinder and piston rod is reduced to the smallest amount possible.

Another purpose of the invention is the provision of pump operating means embodying relatively movable bearings which may be shifted from one point of adjustment to another and secured at the desired point by suitable fastening means, the object being to admit of varying the length of the stroke from one to six feet, more or less, with the result that the wear upon the cylinder and valves is materially reduced for the same volume of water elevated by the ordinary pump.

A further purpose of the invention is the construction of the operating means whereby the same is provided with a pair of sprocket wheels and a chain with fixed pins, said chain being arranged to travel around the sprocket wheels and provided with one or more pins or projections which are adapted to engage a yoke connected with the plunger rod to impart positive reciprocating movement thereto.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a front view of a pump and operating means therefor embodying the invention. Fig. 2 is a section on the line *x—x* of Fig. 1. Fig. 3 is a horizontal section on the line *y—y* of Fig. 1. Fig. 4 is an enlarged view of the upper portion of the yoke showing the sprocket wheels and sprocket chain in coöperative relation therewith. Fig. 5 is a section on the line *z—z* of Fig. 4. Fig. 6 is an enlarged sectional view of the pump head showing more clearly the connecting means between the pump rod and yoke. Fig. 7 is a detail view showing a portion of the sprocket chain whereby the same may be lengthened or shortened to vary the stroke of the pump. Fig. 8 is an enlarged vertical sectional view illustrating a portion of the frame and bearings.

Corresponding and like parts are referred to in the following description, and indicated in all the views of the drawings, by the same reference characters.

The supporting frame for the operating mechanism embodies standards 1. A shaft 2 is mounted in suitable bearings at the top of the supporting frame and is adapted to be driven in any manner from a suitable source of power. A sprocket wheel 3 is fast to the shaft 2 so as to rotate therewith. A second shaft 4 is mounted in bearings 5 which are vertically adjustable to admit of varying the distance between the shafts 2 and 4. The supporting frame is of such construction as to admit of the bearings 5 being adjusted vertically and secured in the adjusted position by suitable fastening means. A sprocket wheel 6 is secured to the shaft 4. A sprocket chain 7 passes around the sprocket wheels 3 and 6 and is of such construction as to admit of links being removed or others replaced to admit of the length of the sprocket chain being varied so that the stroke of the pump may be adjusted to meet existing requirements. Certain links of the sprocket chain 7 are constructed in any well known manner to admit of the removal or insertion of one or more whereby the required length of sprocket chain may be obtained. The sprocket chain is provided in its length with one or more pins or projections 8 which are adapted to make positive engagement with the yoke so as to effect a reciprocating movement thereof.

The yoke 9 is relatively long and slender and comprises similar vertical members connected at their upper and lower ends, the vertical members being of channeled form so as to receive the vertical runs of the sprocket chain and opposite end portions of the sprocket wheels. This construction admits of the parts mutually guiding one another with the result that they are held in a fixed relative position. Each of the vertical members of the yoke is of substantially U-form in cross section and comprises side plates and an intermediate plate, the several plates being folded or otherwise fastened after being assembled. One or more notches 10 are formed along the inner edge of one of the vertical members of the yoke and a corresponding notch or notches 11 are formed in the edge of the opposite vertical member. These notches 10 and 11 constitute stops which are engaged by the pins or projections 8 of the chain so as to effect a positive movement of the yoke. The notches 10 face upward whereas the notches 11 face downward. The pin or projection on the down run of the sprocket chain engages the stops 10 whereas the pin or projection on the up run of the sprocket chain engages the stops 11. The projections 8 leave one set of stops before engaging the other set. It is noted that the ends of a pin 8 project so as to provide engaging parts at opposite sides of the chain to coöperate with the stops of the yoke thereby equalizing the strain and load upon opposite sides of the chain and yoke so as to prevent any possible binding. It is noted that any variation in the length of the sprocket chain 7 produces a corresponding variation in the stroke of the pump since the yoke 9 is connected with the pump rod and the latter moves therewith.

The pump is indicated at 12 and may be of any make or variety and is provided at its upper end with a head 13 through which a pump rod 14 passes, a stuffing box 15 being provided at the upper end of the head 13 to maintain a close joint. The upper end of the pump rod 14 passes through an opening in the lower cross piece of the yoke and is secured thereto in any manner. A spring 15 is interposed between the lower end of the yoke and the pump head, and serves to relieve shock or injury to the valves in the event of the operating chain 7 breaking.

When the parts are properly assembled and the pump is in operation the shaft 2 is positively driven and imparts a rotary movement to the sprocket chain 7. The yoke 9 is moved downward by the projections 8 engaging the stops 10 and is moved upward by such projections engaging the stops 11. When it is required to vary the stroke of the pump the shaft 4 is moved up or down by shifting the bearings 15, the latter being secured in the adjusted position by suitable fastenings in the manner herein stated. The sprocket chain 7 is adapted to renew relation of the shafts 2 and 4 either by removing or adding links thereto. The variation in the length of the operating chain 7 results in changing the stroke of the pump as will be readily appreciated.

From the foregoing description, taken in connection with the accompanying drawing, the advantages of the construction and of the method of operation will be readily apparent to those skilled in the art to which the invention appertains and while I have described the principle of operation of the invention, together with the device which I now consider to be the best embodiment thereof, I desire to have it understood that the device shown is merely illustrative and that such changes may be made when desired as are within the scope of the claim appended hereto.

I claim:—

Pump operating mechanism comprising an endless member provided with a projection and a yoke adapted to be connected with the pump and embodying spaced parallel channeled members serving as a runway or guide for the endless member and each provided on their inner face with a series of stops, the stops of one member having a straight horizontal surface facing upwardly and the stops of the other member presenting a straight horizontal surface facing downwardly, the said projections adapted to be engaged by the projection of the endless member, whereby a positive reciprocating movement is imparted to the yoke.

In testimony whereof I affix my signature in presence of two witnesses.

NELS A. SWENSSON.

Witnesses:
 ALBERT RUNNING,
 W. B. CROWLEY.